(12) United States Patent
Yamamoto

(10) Patent No.: US 10,274,676 B2
(45) Date of Patent: Apr. 30, 2019

(54) OPTICAL WAVEGUIDE DEVICE

(71) Applicant: SHINKO ELECTRIC INDUSTRIES CO., LTD., Nagano-shi, Nagano (JP)

(72) Inventor: Kazunao Yamamoto, Nagano (JP)

(73) Assignee: SHINKO ELECTRIC INDUSTRIES CO., LTD., Nagano-Shi (JP)

( * ) Notice: Subject to any disclaimer, the term of this patent is extended or adjusted under 35 U.S.C. 154(b) by 0 days.

(21) Appl. No.: 15/973,620

(22) Filed: May 8, 2018

(65) Prior Publication Data

US 2018/0341063 A1 Nov. 29, 2018

(30) Foreign Application Priority Data

May 25, 2017 (JP) .................. 2017-103488

(51) Int. Cl.
*G02B 6/122* (2006.01)
*G02B 6/138* (2006.01)
*G02B 6/12* (2006.01)

(52) U.S. Cl.
CPC ........... *G02B 6/1221* (2013.01); *G02B 6/138* (2013.01); *G02B 2006/12069* (2013.01); *G02B 2006/12147* (2013.01)

(58) Field of Classification Search
None
See application file for complete search history.

(56) References Cited

U.S. PATENT DOCUMENTS

| 8,351,751 B2 * | 1/2013 | Yamamoto ............. G02B 6/138 156/275.5 |
| 2014/0112616 A1 | 4/2014 | Numata |
| 2014/0112629 A1 | 4/2014 | Numata et al. |
| 2016/0252686 A1 | 9/2016 | Naumata et al. |

FOREIGN PATENT DOCUMENTS

| JP | 2014-081586 | 5/2014 |
| JP | 2014-081587 | 5/2014 |

* cited by examiner

*Primary Examiner* — Jerry Rahll
(74) *Attorney, Agent, or Firm* — Rankin, Hill & Clark LLP

(57) ABSTRACT

An optical waveguide device is provided. The optical waveguide device includes: a substrate; a first clad layer formed on the substrate; a core layer formed on the first clad layer; and a second clad layer formed on the first clad layer so as to cover the core layer. The second clad layer includes an uncured photosensitive resin covering a first portion of the core layer, and a cured photosensitive resin covering a second portion of the core layer.

3 Claims, 23 Drawing Sheets

OPTICAL WAVEGUIDE DEVICE

This application claims priority from Japanese Patent Application No. 2017-103488, filed on May 25 2017, the entire contents of which are herein incorporated by reference.

BACKGROUND

1. Technical Field

The present disclosure relates to an optical waveguide device.

2. Background Art

With the increase of speed and capacity of transmission data due to development of an information-oriented society, an optical waveguide for transmitting an optical signal has been developed in order to compensate for a limit of transmission speed of an electric signal.

The optical waveguide having a structure in which a core layer is surrounded by a clad layer is mounted on an electronic device (see e.g., JP-A-2014-81586 and JP-A-2014-81587).

As will be described in an undermentioned preliminary matter, an optical waveguide device in which a core layer is exposed from a clad layer is provided as an optical waveguide device optically coupled to a silicon waveguide. The exposed core layer serves as an optical coupling portion, and the optical coupling portion and the silicon waveguide are overlapped with each other. Thus, the silicon waveguide and the optical waveguide device are optically coupled to each other.

A large-sized substrate having first clad layers and core layers formed on the first clad layers is separated into individual pieces. As a result, a plurality of such optical waveguide devices can be obtained. When the substrate is cut in a state in which optical coupling portions of the core layers are exposed on this occasion, the core layers are contaminated by cutting scraps generated during the cutting. In addition, when the substrate is cut together with the core layers, there arises a problem that end portions of the core layers may be damaged.

SUMMARY

According to one or more aspects of the present disclosure, there is provided an optical waveguide device. The optical waveguide device comprises: a substrate; a first clad layer formed on the substrate; a core layer formed on the first clad layer; and a second clad layer formed on the first clad layer so as to cover the core layer. The second clad layer comprises an uncured photosensitive resin covering a first portion of the core layer, and a cured photosensitive resin covering a second portion of the core layer.

According to one or more aspects of the present disclosure, there is provided an optical waveguide device. The optical waveguide device comprises: a substrate; a first clad layer formed on the substrate; a core layer formed on the first clad layer; and a second clad layer formed on the first clad layer so as to cover the core layer. The second clad layer consists of an uncured photosensitive resin. Respective end faces of the second clad layer, the core layer, the first clad layer and the substrate are flush with one another.

DETAILED DESCRIPTION

Embodiments will be described below with reference to the accompanying drawings.

A preliminary matter underlying the embodiments will be described prior to description of the embodiments. Description of the preliminary matter is about the details of personal study of the present inventor, which contain novel techniques not belonging to known techniques.

FIG. 1A to FIG. 5 are views for explaining a problem of a manufacturing method of an optical waveguide device according to the preliminary matter. FIGS. 1A, 2A, 3A and 4A are plan views while FIGS. 1B, 2B, 3B and 4B are sectional views.

Figure 1A:
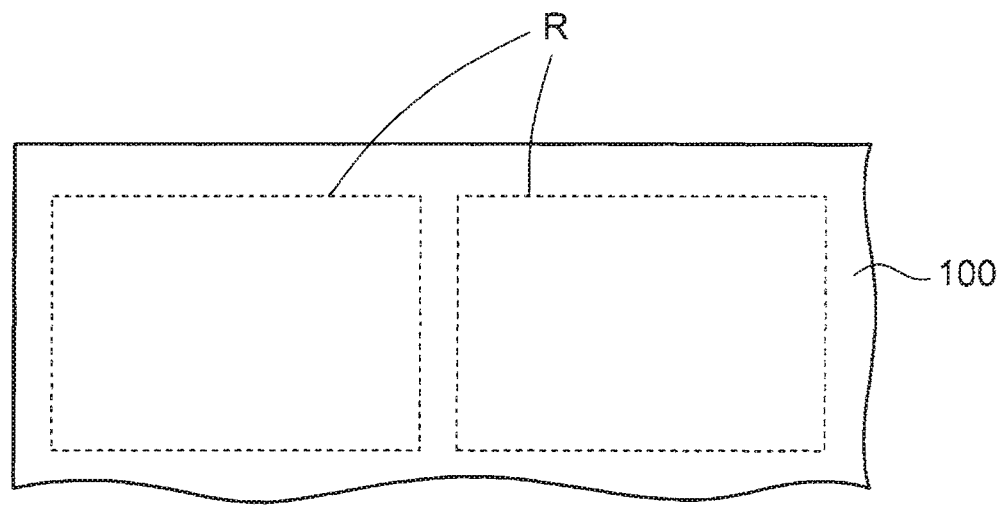
FIGS. 1A and 1B are a plan view and a sectional view showing a manufacturing method of an optical waveguide device according to a preliminary matter (Part 1)
Figure 1B:

In the manufacturing method of the optical waveguide device according to the preliminary matter, first, a substrate 100 is prepared, as shown in FIGS. 1A and 1B. A plurality of product regions R are defined in the substrate 100. Two of the product regions R in the substrate 100 are partially shown in FIGS. 1A and 1B.

Figure 2A:
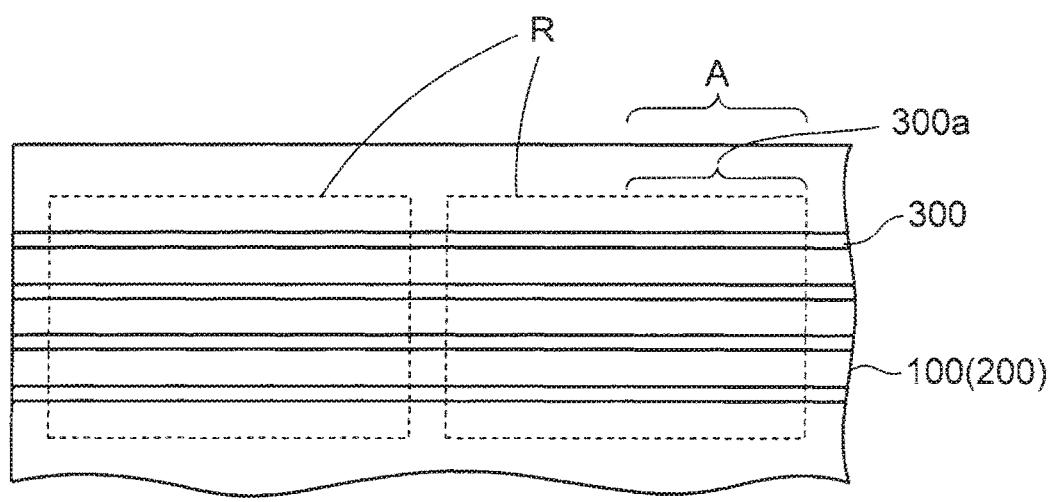
FIGS. 2A and 2B are a plan view and a sectional view showing the manufacturing method of the optical waveguide device according to the preliminary matter (Part 2)
Figure 2B:
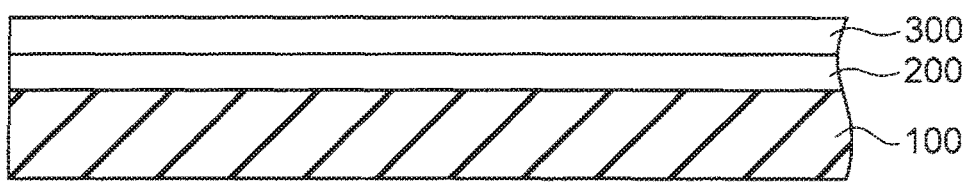

Next, as shown in FIGS. 2A and 2B, a first clad layer 200 is formed on the substrate 100. Further, core layers 300 are patterned into strips and formed on the first clad layer 200. The core layers 300 are disposed to extend transversely in each of the product regions R so that the core layers 300 extend across regions among the product regions R.

On this occasion, as shown in FIG. 2A, portions of the core layers 300 disposed in one side region A of each product region R in the extension direction of the core layers 300 are formed as optical coupling portions 300a.

Figure 3A:
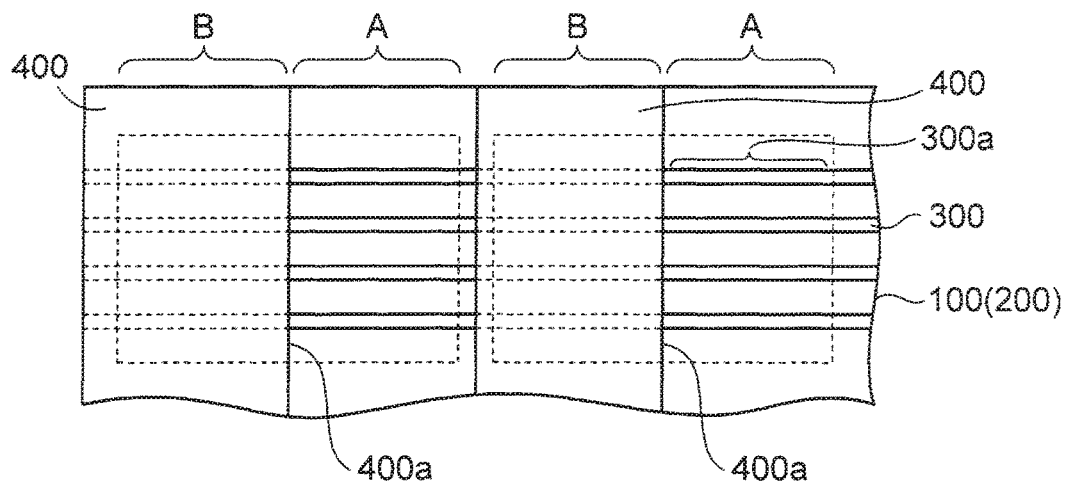
FIGS. 3A and 3B are a plan view and a sectional view showing the manufacturing method of the optical waveguide device according to the preliminary matter (Part 3)
Figure 3B:
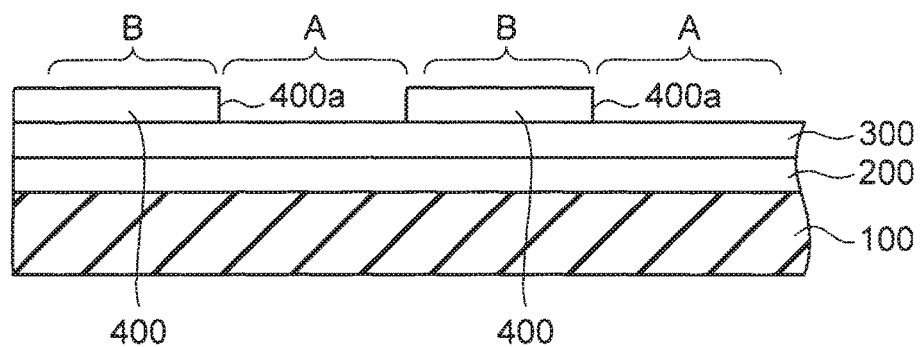

Successively, as shown in FIGS. 3A and 3B, a second clad layer 400 is patterned and formed on the first clad layer 200 and the core layers 300. On this occasion, the pattern of the second clad layer 400 is disposed in the other side region B of each product region R, and an opening portion 400a of the second clad layer 400 is disposed collectively in the one side regions A of the product region R. Thus, the optical coupling portions 300a of the core layers 300 are exposed from the second clad layer 400.

A photocurable resin is irradiated with ultraviolet light through a photomask to be developed. As a result, each of the core layers 300 and the clad layer 400 is patterned and formed.

Figure 4A:
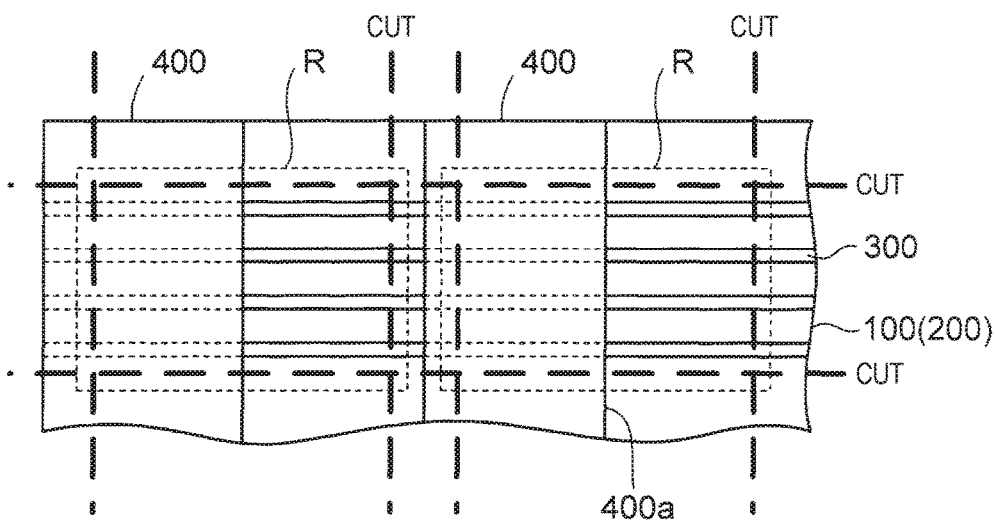
FIGS. 4A and 4B are a plan view and a sectional view showing the manufacturing method of the optical waveguide device according to the preliminary matter (Part 4)
Figure 4B:
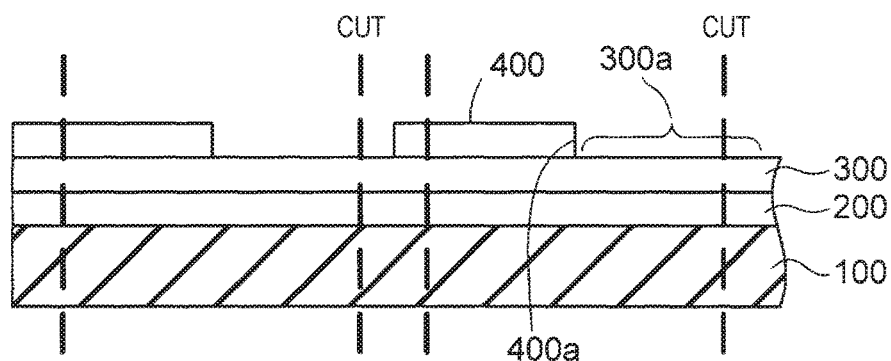

Next, as shown in FIGS. 4A and 4B, an assembly ranging from the second clad layer 400 to the substrate 100 is cut so that each product region R can be obtained. On this occasion, the assembly is cut along an outer peripheral portion of the product region R by a rotary blade of a cutting apparatus.

Here, when the optical coupling portions 300a of the core layers 300 are cut, the optical coupling portions 300a of the core layers 300 are uncovered and exposed from the second clad layer 400. For this reason, the core layers 300 may be contaminated by cutting scraps generated during the cutting, or the core layers 300 may be damaged when the core layers 300 are cut, as shown in FIG. 5.

The damage of the core layers 300 may cause generation of noise in signals during optical coupling or may create a trigger to separate the core layers 300 from the first clad layer 200.

Figure 5:
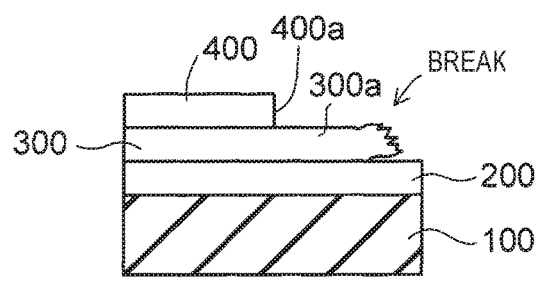
FIG. 5 is a sectional view showing the manufacturing method of the optical waveguide device according to the preliminary matter (Part 5)

An optical waveguide in FIG. 5 is a single-mode optical waveguide. Each of the core layers 300 are 5 µm to 10 µm wide and 5 µm to 10 µm high. Thus, the core layer 300 is formed to have a minute sectional area. A silicon waveguide including core layers smaller in sectional area than the core layers 300 is optically coupled to the core layers 300 of the optical waveguide in FIG. 5.

On this occasion, it is difficult to align end faces of the minute core layers 300 of the optical waveguide in FIG. 5 with end faces of the minute core layers of the silicon waveguide respectively. Therefore, it is difficult to optically couple the end faces of the minute core layers 300 of the optical waveguide in FIG. 5 to the end faces of the minute core layers of the silicon waveguide respectively.

To address this problem, the core layers of the silicon waveguide are overlapped with the optical coupling portions 300a of the core layers 300 of the optical waveguide in FIG. 5 so as to be optically coupled thereto respectively.

Since such an optical coupling structure using overlapping is used, it is necessary to cut the optical coupling portions 300a of the core layers 300 in a state in which the optical coupling portions 300a of the core layers 300 are exposed, as described above. Therefore, damage may be caused to the core layers 300.

The aforementioned problem can be solved by any of optical waveguide devices according to embodiments which will be described below.

The present inventor has found out a technique in which no damage is caused to the core layers 300 during cutting of the optical coupling portions 300a of the core layers 300, and the optical coupling portions 300a of the core layers 300 can be exposed from the second clad layer 400.

First Embodiment

FIG. 6 to FIG. 13B are views showing a manufacturing method of an optical waveguide device according to a first embodiment. FIGS. 14A to 14D are views showing the optical waveguide device according to the first embodiment. A structure of the optical waveguide device will be described below while the manufacturing method of the optical waveguide device is described.

Figure 6:
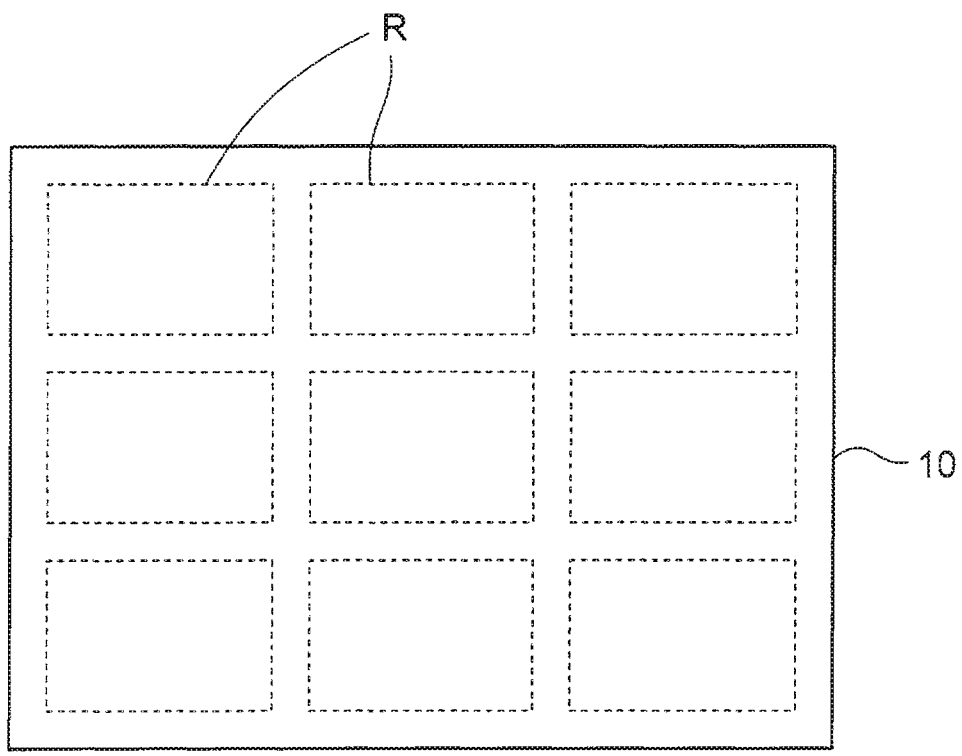
FIG. 6 is a plan view showing a manufacturing method of an optical waveguide device according to a first embodiment (Part 1)

In the manufacturing method of the optical waveguide device according to the first embodiment, first, a substrate 10 is prepared, as shown in FIG. 6. For example, the substrate 10 is formed out of an insulating resin material such as a glass epoxy resin. The substrate 10 may be a rigid substrate high in rigidity, or a flexible substrate low in rigidity. The substrate 10 includes an insulating material called a support or a base.

As having been described in the aforementioned preliminary matter, the substrate 10 is a large-sized substrate in which a plurality of product regions R are defined in order to obtain multiple optical waveguide devices. Finally, the substrate 10 is cut along outer peripheral portions of the product regions R so that individual optical waveguide devices can be obtained.

Figure 7A:
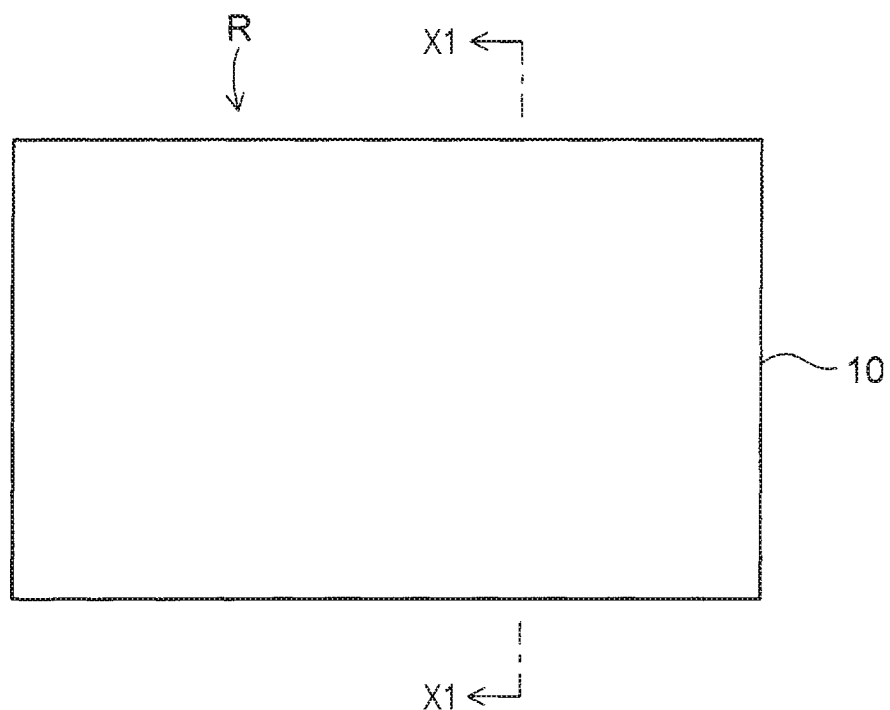
FIGS. 7A and 7B are a plan view and a sectional view showing the manufacturing method of the optical waveguide device according to the first embodiment (Part 2)
Figure 7B:

In FIGS. 7A and 7B and drawings following FIGS. 7A and 7B, one of the product regions R in the substrate 10 in FIG. 6 will be partially shown and described. FIG. 7A partially shows the product region R of the substrate 10 in FIG. 6. FIG. 7B is a sectional view taken along a line X1-X1 of FIG. 7A. The same rule will be applied to the following drawings corresponding to FIGS. 7A and 7B.

Figure 8A:
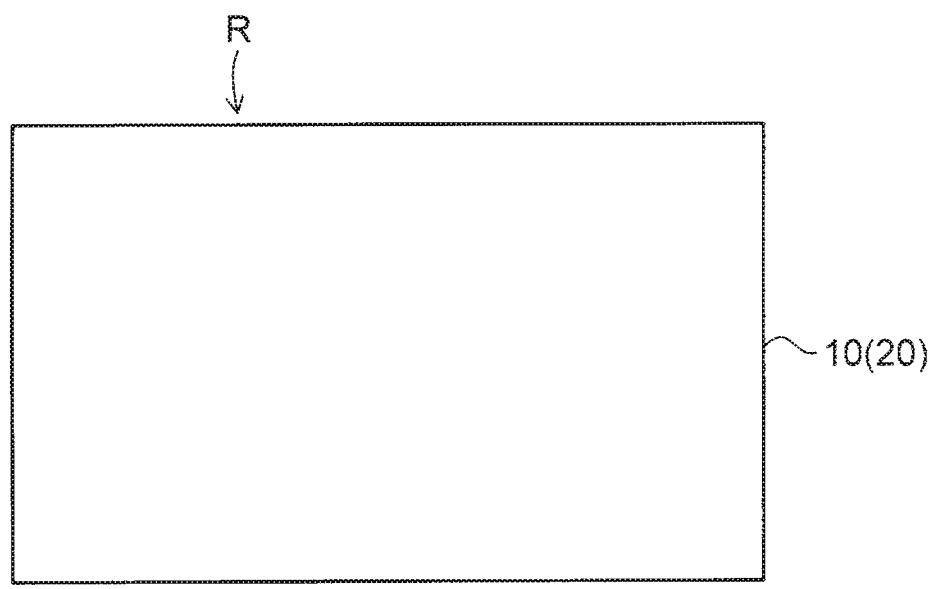
FIGS. 8A and 8B are a plan view and a sectional view showing the manufacturing method of the optical waveguide device according to the first embodiment (Part 3)
Figure 8B:
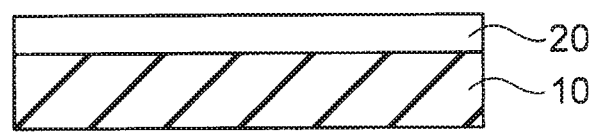

As shown in FIGS. 8A and 8B, a first clad layer 20 is formed on the substrate 10. A photocurable resin is irradiated with ultraviolet light, and then subjected to heat treatment at a temperature 150° C. to 200° C. so that the photocurable resin is cured. As a result, the first clad layer 20 is obtained.

The first clad layer 20 is formed all over the substrate 10 in which the plurality of product regions R shown in FIG. 6 are defined. When the first clad layer 20 is patterned in order to adjust its external shape, the photocurable resin is irradiated with ultraviolet light through a photomask to be developed. As a result, the first clad layer 20 is obtained.

As a formation method of the photocurable resin, a resin sheet may be pasted, or a liquid resin may be applied. The first clad layer 20 is, for example, about 10 μm to 30 μm thick.

Figure 9A:
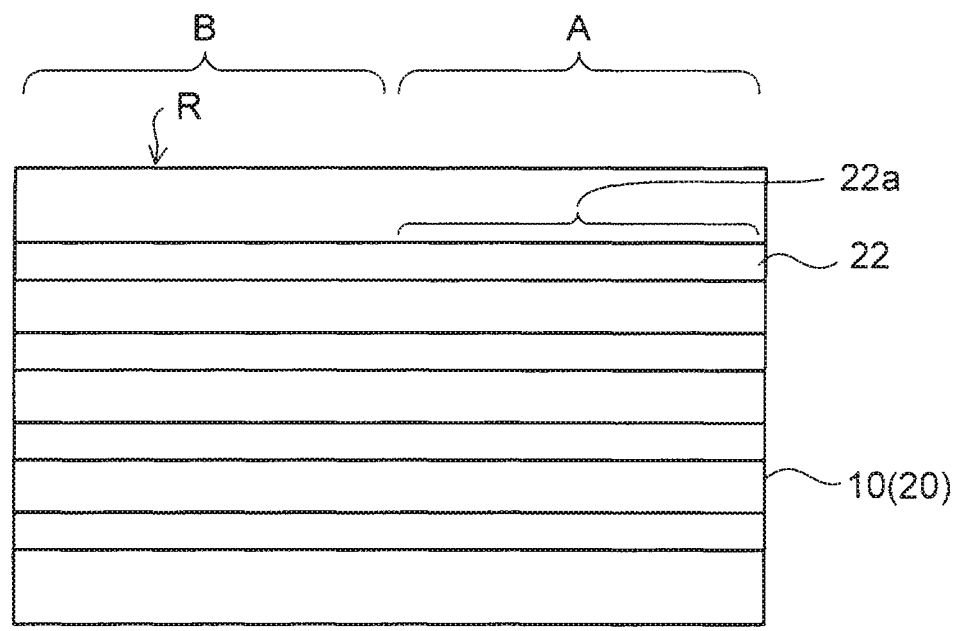
FIGS. 9A and 9B are a plan view and a sectional view showing the manufacturing method of the optical waveguide device according to the first embodiment (Part 4)
Figure 9B:
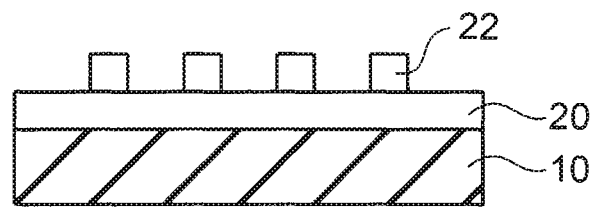

Successively, as shown in FIGS. 9A and 9B, a photocurable resin (not shown) for obtaining core layers is formed on the first clad layer 20. Further, the photocurable resin is irradiated with ultraviolet light through a photomask to be developed. Then, the photocurable resin is subjected to heat treatment at a temperature of about 150° C. to 200° C. As a result, the photocurable resin is cured.

In this manner, the plurality of core layers 22 are disposed side by side as strip-like patterns on the first clad layer 20. Each of the core layers 22 is set to be 5 μm to 10 μm wide. The core layer 22 is set to be 5 μm to 10 μm high.

Thus, each of the core layers 22 is formed to have a minute sectional area in order to obtain a single-mode optical waveguide in the embodiment.

The plurality of core layers 22 are disposed to extend transversely in each of the product regions R so that the core layers 22 extend across regions among the product regions R in the aforementioned FIG. 6.

Here, as shown in FIG. 9A, each product region R is divided into two regions at the center in an extension direction of the core layers 22. The two regions are defined as one side region A on a right side and the other side region B on a left side. One side portions of the core layers 22 in the extension direction thereof disposed in the one side region A within the product region R are defined as optical coupling portions 22a respectively.

Thus, the core layers 22 including the optical coupling portions 22a defined in the one side portions in the extension direction are formed on the first clad layer 20.

Figure 10A:
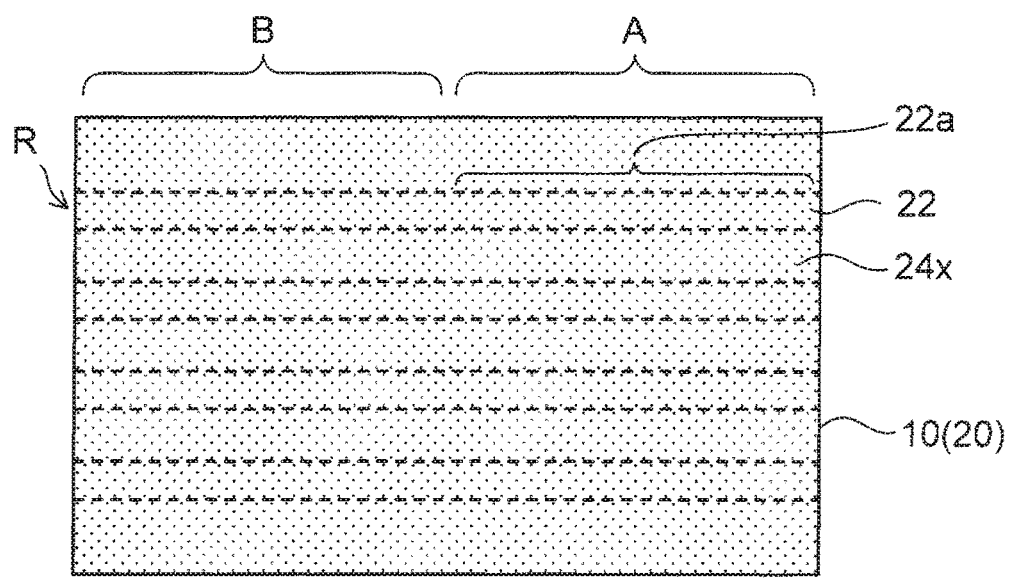
FIGS. 10A and 10B are a plan view and a sectional view showing the manufacturing method of the optical waveguide device according to the first embodiment (Part 5)
Figure 10B:
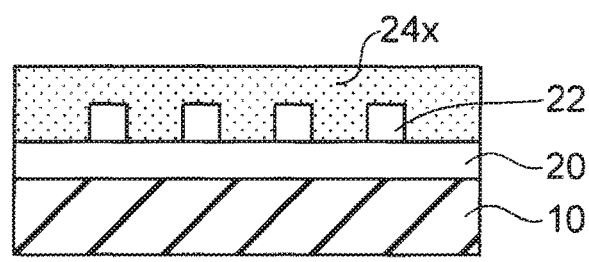

Next, as shown in FIGS. 10A and 10B, a photocurable resin layer 24x for obtaining a second clad layer is formed on the first clad layer 20 and the core layers 22. An upper face of the photocurable resin 24x formed thus is flat in a state in which upper faces and side faces of the core layers 22 are covered with the photocurable resin 24x.

For example, a negative type photosensitive epoxy resin or polyimide resin, or the like, can be used as the photocurable resin 24x. A similar photocurable resin or the same photocurable resin may be also used for the aforementioned first clad layer 20 and the aforementioned core layers 22.

The photocurable resin 24x includes a reactive functional group contributing to photocuring, and a reactive function group contributing to thermal curing. Therefore, the photocurable resin 24x is cured by photocuring and thermal curing.

Figure 11:
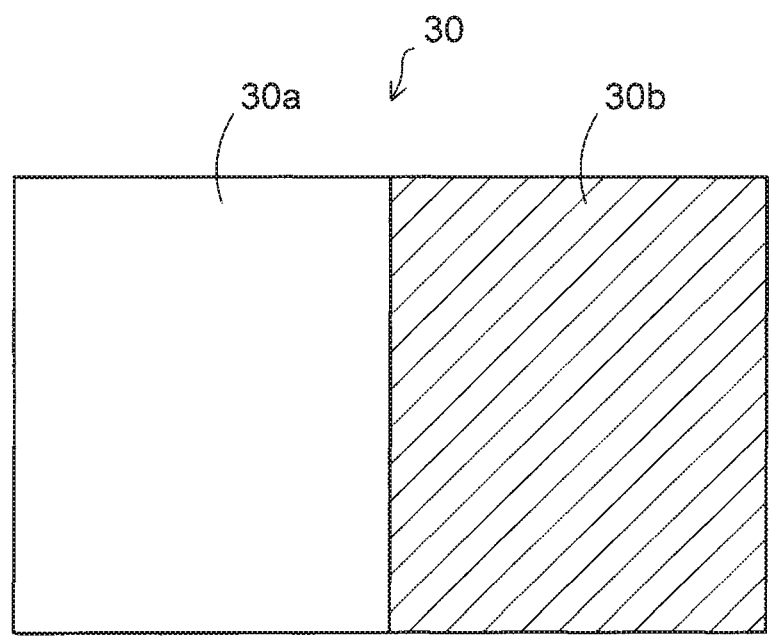
FIG. 11 is a plan view showing the manufacturing method of the optical waveguide device according to the first embodiment (Part 6)

Successively, as shown in FIG. 11, a photomask 30 is prepared. A region of the photomask 30 corresponding to one of the product regions R in the aforementioned FIG. 6 is partially illustrated in FIG. 11. The photomask 30 includes a light-shielding portion 30a and a light-transmitting portion 30b.

The light-shielding portion 30a of the photomask 30 is disposed correspondingly to the one side region A of each product region R in FIG. 10A. The light-shielding portion 30a is used to prevent one portion of the photocurable resin 24x disposed in the one side region A from being exposed to light, and leave the portion of the photocurable resin 24x as an uncured portion.

The light-transmitting portion 30b of the photomask 30 is disposed correspondingly to the other side region B of the product region R in FIG. 10A. The light-transmitting portion 30b is used to expose the other portion of the photocurable resin 24x disposed in the other side region B of the product region R to light, and change the other portion of the photocurable resin 24x to a cured portion.

The photocurable resin 24x in FIGS. 10A and 10B is irradiated with and exposed to ultraviolet light through the light-transmitting portion 30b of the photomask 30 in FIG. 11. As a result, the photocurable resin 24x in the other side region B of the product region R is cured. On this occasion, the photocurable resin 24x in the one side region A of the product region R is shielded against the light by the light-shielding portion 30a of the photomask 30. Accordingly, the photocurable resin 24x in the one side region A of the product region R is not exposed to the light and maintained at an uncured state.

At this point of time, the portion of the photocurable resin 24x which is exposed to the light is not treated by a developing solution, and the portion of the photocurable resin 24x which is unexposed to the light and disposed in the one side region A of the product region R is left in advance as an uncured portion.

Then, the photocurable resin 24x is subjected to heat treatment (post baking) at a temperature of 150° C. to 200° C. As a result, a second clad layer 24 is formed on the first clad layer 20 and the core layers 22. The second clad layer 24 is, for example, about 10 μm to 30 μm thick.

Figure 12A:
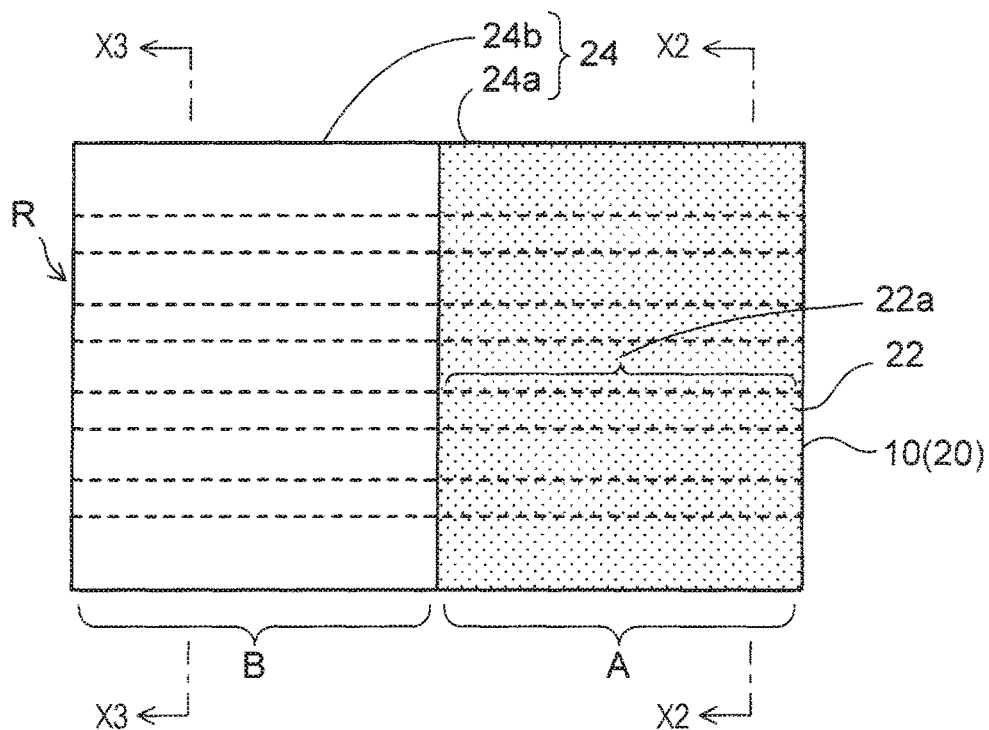
FIGS. 12A to 12C are a plan view and sectional views showing the manufacturing method of the optical waveguide device according to the first embodiment (Part 7)

Thus, as shown in FIG. 12A, an uncured portion 24a of the second clad layer 24 is disposed in the one side region A of the product region R. On the other hand, a cured portion 24b of the second clad layer 24 is disposed in the other side regions B of the product region R.

Figure 12B:
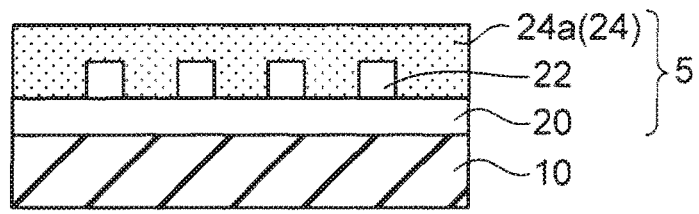

FIG. 12B is a sectional view taken along a line X2-X2 of FIG. 12A. In addition, FIG. 12C is a sectional view taken along a line X3-X3 of FIG. 12A.

Figure 12C:
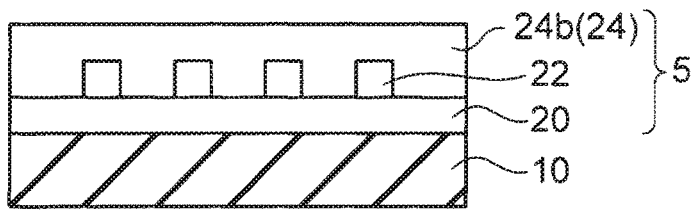

In the illustration of FIGS. 12A to 12C etc., the uncured portion 24a of the second clad layer 24 is indicated as a "dotted region" and the cured portion 24b of the second clad layer 24 is indicated as a "white region".

The portion of the photocurable resin 24x in the other side region B is completely cured by photocuring and thermal curing. As a result, the cured portion 24b of the second clad layer 24 is obtained. In addition, the portion of the photocurable resin 24x in the one side region A is not exposed to the light but subjected to only heat treatment at a temperature of 150° C. to 200° C. As a result, the uncured portion 24a of the second clad layer 24 is obtained. Therefore, the uncured portion 24a of the second clad layer 24 is maintained at an uncured state. The second clad layer 24 is formed to include the uncured portion 24a and the cured portion 24b integrally connected to each other.

Thus, as shown in FIGS. 12A and 12B, the optical coupling portions 22a of the core layers 22 are covered with the uncured portion 24a of the second clad layer 24 in the product region R. In addition, as shown in FIGS. 12A and 12C, regions of the core layers 22 other than the optical coupling portions 22a are covered with the cured portion 24b of the second clad layer 24 in the product region R.

Thus, an optical waveguide 5 is configured by the first clad layer 20, the core layers 22 formed on the first clad layer 20, and the second clad layer 24 formed on the first clad layer 20 and the core layers 22.

In the optical waveguide 5, a refractive index of each of the core layers 22 is set to be higher than each of refractive indexes of the first clad layer 20 and the second clad layer 24.

In the embodiment, the uncured portion 24a and the cured portion 24b of the second clad layer 24 are formed out of the photocurable resin 24x which is a negative type photosensitive resin.

Alternatively, the uncured portion 24a and the cured portion 24b of the second clad layer 24 may be formed out of a positive type photosensitive resin.

The negative type photosensitive resin has one portion which is irradiated with and exposed to the light to be modified from soluble one to insoluble one due to cross-linking reaction, and the other portion which is unexposed to the light (the uncured portion) and then removed by a developing solution. As a result, the portion of the negative type photosensitive resin exposed to the light is left as the cured portion.

On the contrary, the positive type photosensitive resin has one portion (uncured portion) which is irradiated with and exposed to the light to be chemically changed from alkali-insoluble one to alkali-soluble one and then removed by a developing solution. As a result, the other portion of the positive type photosensitive resin unexposed to the light is left as the cured portion.

When the positive type photosensitive resin is used, a positive type photomask reversed to the negative type photomask in the aforementioned FIG. 11 in terms of black and white is used. The positive type photosensitive resin is exposed to the light through the positive type photomask.

Thus, the portion of the positive type photosensitive resin exposed to the light becomes the uncured portion 24a of the second clad layer 24 soluble in the developing solution. In addition, the portion of the positive type photosensitive resin unexposed to the light is thermally cured to become the cured portion 24b of the second clad layer 24.

As described above, the second clad layer 24 may be formed out of the negative type photosensitive resin (photocurable resin 24x) or may be formed out of the positive type photosensitive resin. The uncured portion 24a of the second clad layer 24 is soluble and removable in a negative or positive developing solution. On the other hand, the cured portion 24b of the second clad layer 24 is insoluble in the negative or positive type developing solution.

Figure 13A:
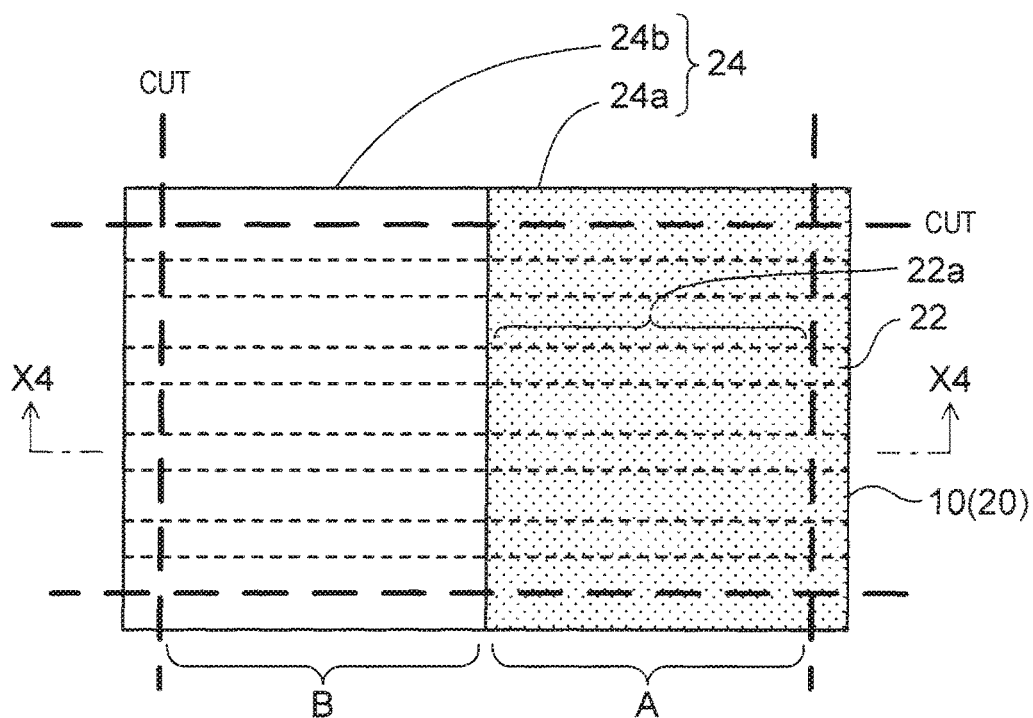
FIGS. 13A and 13B are a plan view and a sectional view showing the manufacturing method of the optical waveguide device according to the first embodiment (Part 8)
Figure 13B:
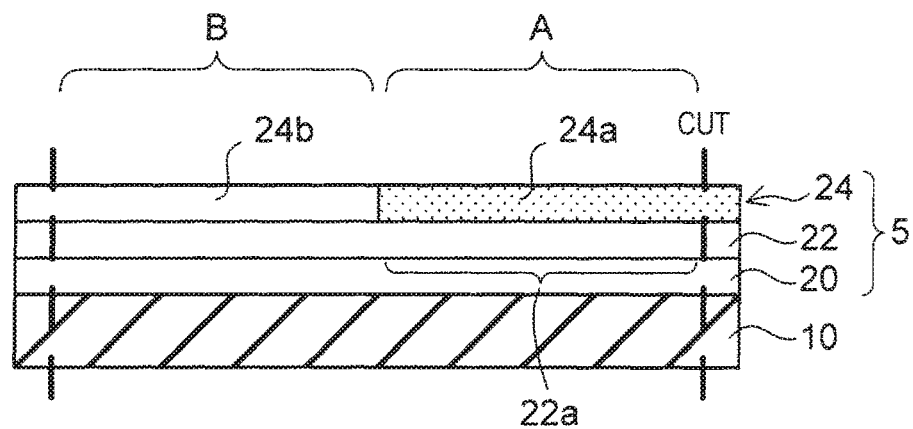

Next, as shown in FIGS. 13A and 13B, an assembly including the second clad layer 24, the core layers 22, the first clad layer 20, and the substrate 10 is cut along an outer peripheral portion of each product region R by a rotary blade etc. of a cutting apparatus so as to be separated into an individual piece. FIG. 13B is a sectional view taken along a line X4-X4 of FIG. 13A.

On the occasion, the optical coupling portions 22a of the core layers 22 are covered with the uncured portion 24a of the second clad layer 24 to be protected thereby, as shown in FIG. 13B. Therefore, the optical coupling portions 22a of the core layers 22 can be prevented from being damaged when the core layers 22 are cut. Therefore, the core layers 22 can be cut reliably. In addition, the core layers 22 can be prevented from being contaminated by cutting scraps.

Thus, respective end faces of the second clad layer 24, the core layers 22, the first clad layer 20 and the substrate 10 in the extension direction of the core layers 22 are flush with one another.

Figure 14A:
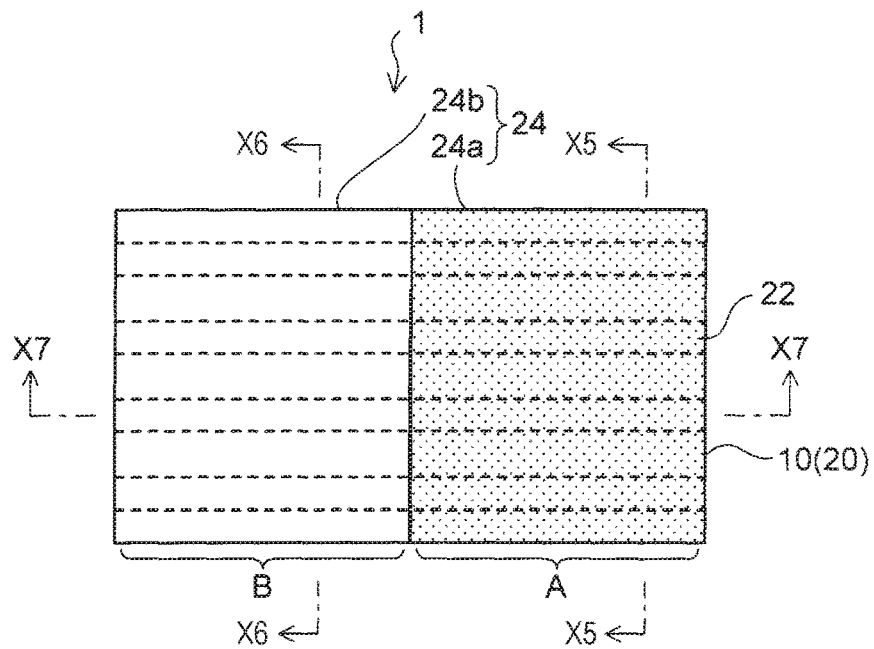
FIGS. 14A to 14D are a plan view and sectional views showing the optical waveguide device according to the first embodiment.
Figure 14B:
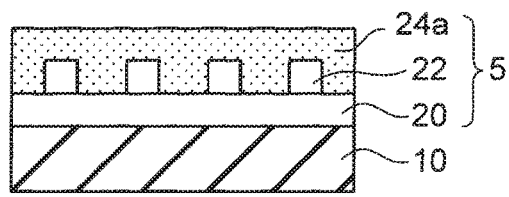
Figure 14C:
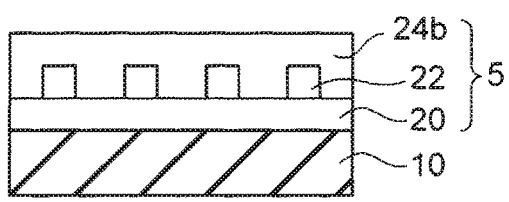
Figure 14D:
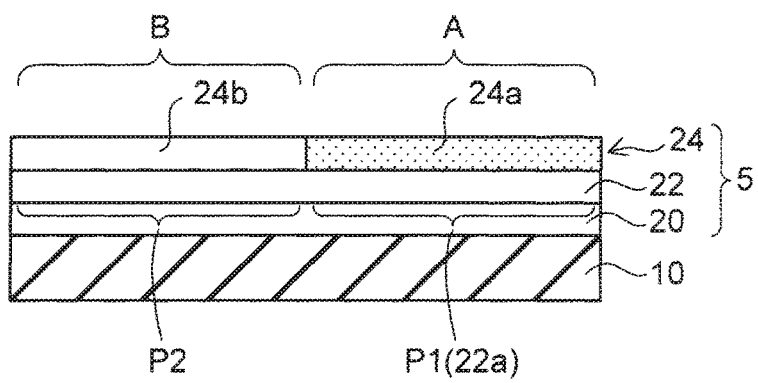

As described above, an optical waveguide device 1 according to the first embodiment is obtained, as shown in FIGS. 14A to 14D. FIG. 14A is a plan view. FIG. 14B is a sectional view taken along a line X5-X5 of FIG. 14A. In addition, FIG. 14C is a sectional view taken along a line X6-X6 of FIG. 14A. Further, FIG. 14D is a sectional view taken along a line X7-X7 of FIG. 14A. The same rule is applied to FIGS. 15A to 15D which will be described later.

As shown in FIGS. 14A to 14C, the first clad layer 20 is formed on the substrate 10 in the optical waveguide device 1 according to the first embodiment. The plurality of core layers 22 are disposed on the first clad layer 20 to extend transversely.

In addition, the second clad layer 24 is formed on the first clad layer 20 and the core layers 22. The upper faces and the side faces of the core layers 22 are covered with the second clad layer 24. The optical waveguide 5 is configured by the first clad layer 20, the core layers 22 and the second clad layer 24.

Referring to FIG. 14D, each of the core layers 22 is divided into two in the extension direction. The two are defined as one side portion P1 on the right side and the other side portion P2 on the left side. The one side portion P1 of the core layer 22 in the extension direction serves as the optical coupling portion 22a.

In addition, the second clad layer 24 includes the uncured portion 24a with which the one side portions P1 of the core layer 22 in the extension direction are covered, and the cured portion 24b with which the other side portions P2 of the core layers 22 in the extension direction are covered.

Thus, the optical coupling portions 22a of the core layers 22 are covered with the uncured portion 24a of the second clad layer 24. The uncured portion 24a consists of the uncured portion of the photosensitive resin. In addition, the cured portion 24b consists of the cured portion of the photosensitive resin.

As described in the aforementioned manufacturing method, the optical coupling portions 22a of the core layers 22 are covered with the uncured portion 24a of the second clad layer 24 when the optical waveguide 5 and the substrate 10 are cut. Therefore, the core layers 22 can be prevented from being damaged when the optical coupling portions 22a of the core layers 22 are cut.

Accordingly, as shown in FIG. 14D, opposite side end faces of the core layers 22 in the extension direction in the optical waveguide device 1 are cut faces flush with one another. The one side region A in the optical waveguide device 1 has an end face in which cut faces of the uncured portion 24a of the second clad layer 24 (the uncured portion of the photosensitive resin), the optical coupling portions 22a of the core layers 22, the first clad layer 20 and the substrate 10 are flush with one another as a whole of the end face.

In addition, the other side region B in the optical waveguide device 1 has an end face in which cut faces of the cured portion 24b of the second clad layer 24, the other portions of the core layers 22 than the optical coupling portions 22a, the first clad layer 10 and the substrate 10 are flush with one another as a whole of the end surface.

When the second clad layer 24 is formed out of the negative type photosensitive resin (photocurable resin 24x), the cured portion 24b of the second clad layer 24 in the other side region B is formed of the portion of the negative type photosensitive resin (photocurable resin 24x) which is cured by light irradiation and heat treatment. In addition, the uncured portion 24a of the second clad layer 24 in the one side region A is formed of the portion of the negative type photosensitive resin (photocurable resin 24x) which is not irradiated with and unexposed to the light.

The uncured portion 24a of the second clad layer 24 is soluble and removable in the negative type developing solution.

Alternatively, when the second clad layer 24 is formed out of the positive type photosensitive resin, the cured portion 24b of the second clad layer 24 in the other side region B is formed of the portion of the positive type photosensitive resin which is not irradiated with and unexposed to the light and which is thermally cured. In addition, the uncured portion 24a of the second clad layer 24 in the one side region A is formed of the portion of the positive type photosensitive resin which is irradiated with and exposed to the light.

In this case, the uncured portion 24a of the second clad layer 24 is soluble and removable in the positive type developing solution.

Thus, the second clad layer 24 is treated by the developing solution at a subsequent required stage. As a result, the uncured portion 24a of the second clad layer 24 is removed so that the optical coupling portions 22a of the core layers 22 can be exposed from the second clad layer 24.

In the optical waveguide device 1 according to the first embodiment, as described above, no damage is caused to the core layers 22 during cutting of the optical coupling portions 22a of the core layers 22, and the optical coupling portions 22a of the core layers 22 can be exposed from the second clad layer 24.

Incidentally, the optical waveguide device 1 is housed in a light-shielded container and then transported so that the uncured portion 24a of the second clad layer 24 does not sense light when the optical waveguide device 1 is transported to the outside. This is because, when the second clad layer 24 is formed out of the negative type photosensitive resin, the uncured portion 24a cannot be removed by a developing solution if the uncured portion 24a senses the light.

Figure 15A:
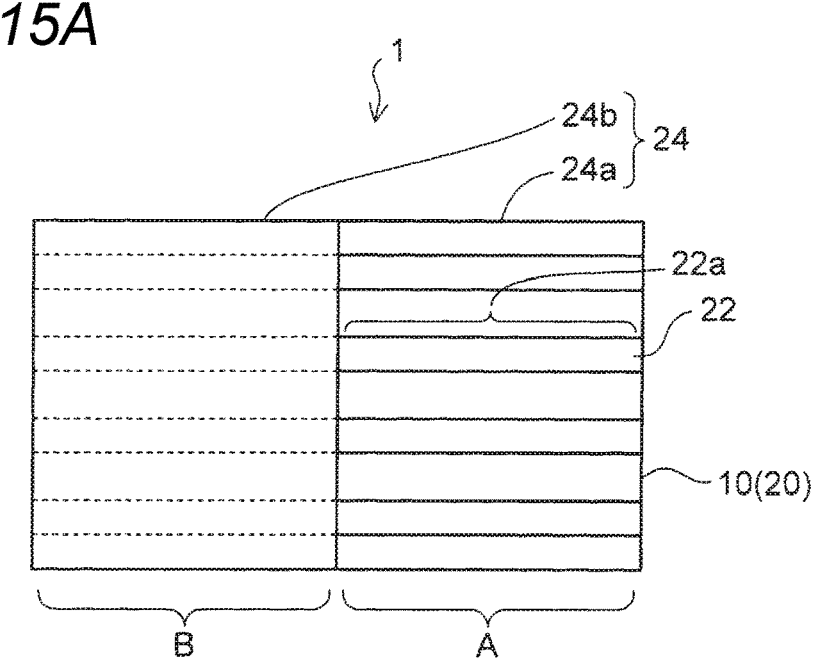
FIGS. 15A to 15D are a plan view and sectional views showing a state in which an uncured portion of a second clad layer of the optical waveguide device of FIGS. 14A to 14D has been removed.
Figure 15B:
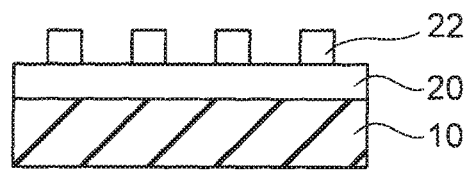

Next, a method of optically coupling a silicon waveguide to the optical waveguide device 1 according to the first embodiment will be described. As shown in FIGS. 15A, 15B, and 15D, the optical waveguide device 1 in the aforementioned FIGS. 14A to 14D is treated by a developing solution. Thus, the uncured portion 24a of the second clad layer 24 of the optical waveguide device 1 is soluble and removable in the developing solution.

Thus, in the one side region A of the optical waveguide device 1, as shown in FIGS. 15A, 15B and 15D, the portion of the second clad layer 24 on the optical coupling portions 22a of the core layers 22 is opened so that the optical coupling portions 22a of the core layers 22 are exposed from the second clad layer 24.

When the photocurable resin 24x (negative type photosensitive resin) is used, an inorganic alkali solution of sodium carbonate (carbonate of soda), sodium hydroxide (caustic soda) etc. can be used as the developing solution.

Alternatively, when the second clad layer 24 is formed out of a positive type photosensitive resin, an organic alkali solution of TMHA (tetramethylammonium hydroxide) etc. can be used as the developing solution.

Figure 15C:
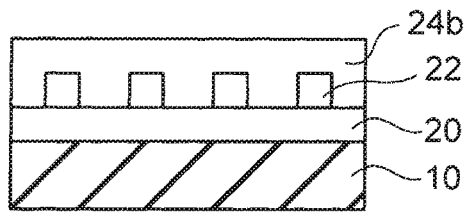
Figure 15D:
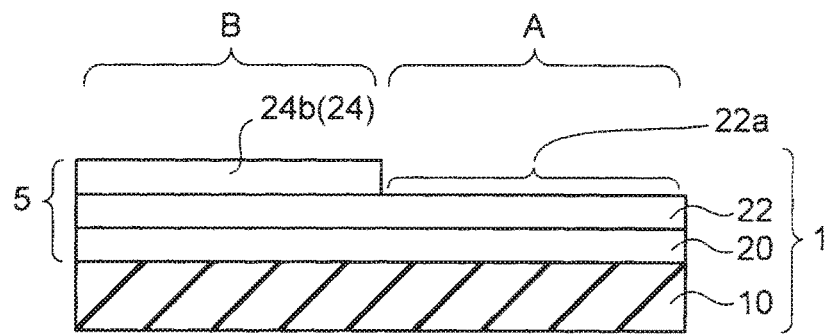

As shown in FIGS. 15A, 15C and 15D, the cured portion 24b of the second clad layer 24 is left on the core layers 22 in the other side region B of the optical waveguide device 1.

Figure 16A:
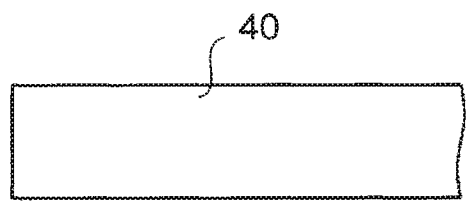
FIGS. 16A and 16B are sectional views showing a state in which a silicon waveguide is overlapped with optical coupling portions of core layers of the optical waveguide device of FIG. 15D so as to be optically coupled thereto.
Figure 16A:
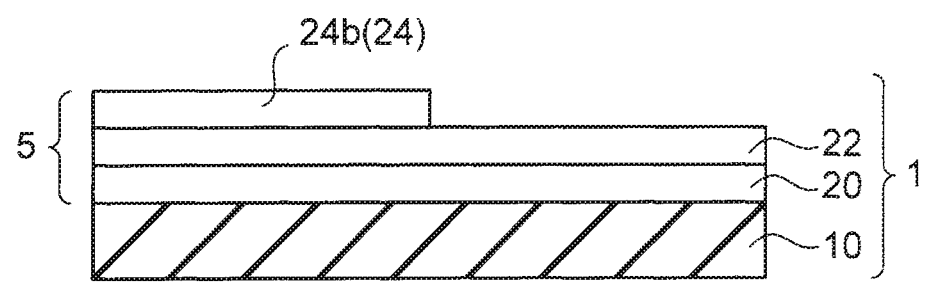

Next, as shown in FIG. 16A, the optical waveguide device 1 in FIG. 15D and a silicon waveguide 40 are prepared. The silicon waveguide 40 is a fine optical waveguide built in a silicon chip. The silicon waveguide 40 is used in silicon photonics technology in which an optical circuit etc. is integrated in the silicon chip.

A section of each of core layers (not shown) in the silicon waveguide 40 is set to be smaller than the section of each of the core layers 22 in the optical waveguide device 1.

For example, the core layer 22 of the optical waveguide device 1 is 5 μm to 10 μm wide and 5 μm to 10 μm high, and the core layer of the silicon waveguide 40 is 0.2 μm to 1 μm wide and 0.2 μm to 1 μm high.

The core layers of the silicon waveguide 40 are optically coupled to the core layers 22 of the optical waveguide device 1 respectively.

As described in the preliminary matter, it is difficult to align the end faces of the minute core layers 22 of the optical waveguide device 1 with end faces of the minute core layers of the silicon waveguide 40 respectively. Thus, it is difficult to optically couple the end faces of the minute core layers 22 of the optical waveguide device 1 to the end faces of the minute core layers of the silicon waveguide 40 respectively.

Figure 16B:
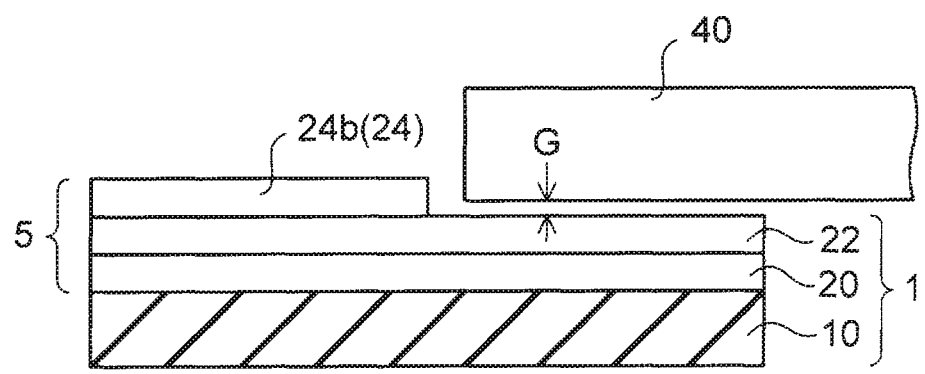

To solve this problem, the core layers of the silicon waveguide 40 are overlapped with the upper faces of the optical coupling portions 22a of the core layers portions 22 of the optical waveguide device 1, so as to be optically coupled thereto respectively, as shown in FIG. 16B. Each of the optical coupling portions 22a has a predetermined length. On this occasion, in order to reduce an optical loss at the optical coupling, an appropriate gap G (space) is provided between the optical coupling portions 22a of the core layers 22 of the optical waveguide device 1 and the core layers of the silicon waveguide 40.

Light leaking out of lower faces of the core layers of the silicon waveguide 40 are incident on the optical coupling portions 22a of the core layers 22 of the optical waveguide device 1 respectively. Thus, the core layers of the silicon waveguide 40 and the optical coupling portions 22a of the core layers 22 of the optical waveguide device 1 are optically coupled to each other respectively.

In the first embodiment, no damage is caused to the core layers 22 of the optical waveguide device 1, and the optical coupling portions 22a of the core layers 22 can be exposed. Accordingly, the silicon waveguide 40 can be optically coupled to the optical waveguide device 1 reliably.

Second Embodiment

FIG. 17A to FIG. 20 are views showing a manufacturing method of an optical waveguide device according to a second embodiment. FIGS. 21A and 21B are views showing the optical waveguide device according to the second embodiment.

In the second embodiment, detailed description about the same steps and the same elements as those in the first embodiment will be omitted.

In the optical waveguide device according to the second embodiment, entire core layers of an optical waveguide serve as optical coupling portions. The entire core layers are covered with a protective layer which is formed in a removable state.

Figure 17A:
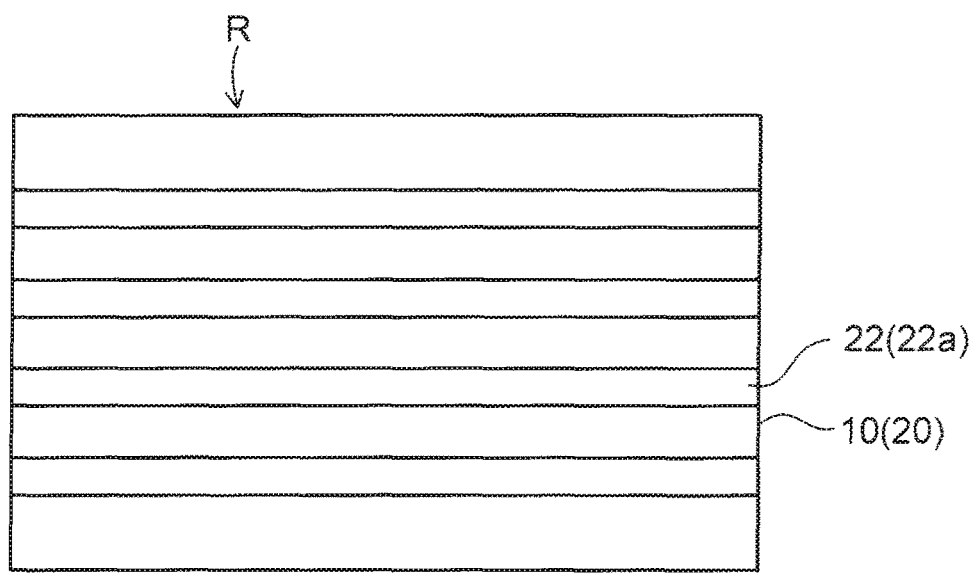
FIGS. 17A and 17B are a plan view and a sectional view showing a manufacturing method of an optical waveguide device according to a second embodiment (Part 1)
Figure 17B:
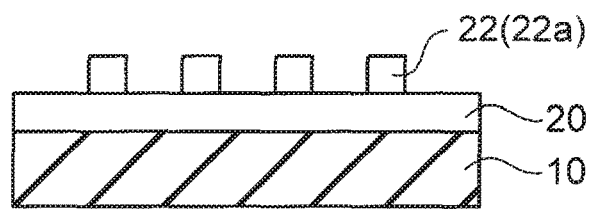

As shown in FIGS. 17A and 17B, first, the same steps as the steps of FIGS. 7A to 9B in the aforementioned first embodiment are performed. Thus, the same structure assembly as that in FIGS. 9A and 9B can be obtained. In FIGS. 17A and 17B, a first clad layer 20 and core layers 22 are formed on a substrate 10.

In FIGS. 17A and 17B, one of product regions R in the substrate 10 shown in FIG. 6 is partially shown in a similar manner to or the same manner as in FIGS. 9A and 9B in the first embodiment.

In the second embodiment, the entire core layers 22 disposed in each product region R are formed as optical coupling portions 22a respectively. In this manner, the entire core layers 22 functioning as the optical coupling portions 22a respectively are formed on the first clad layer 20.

Figure 18A:
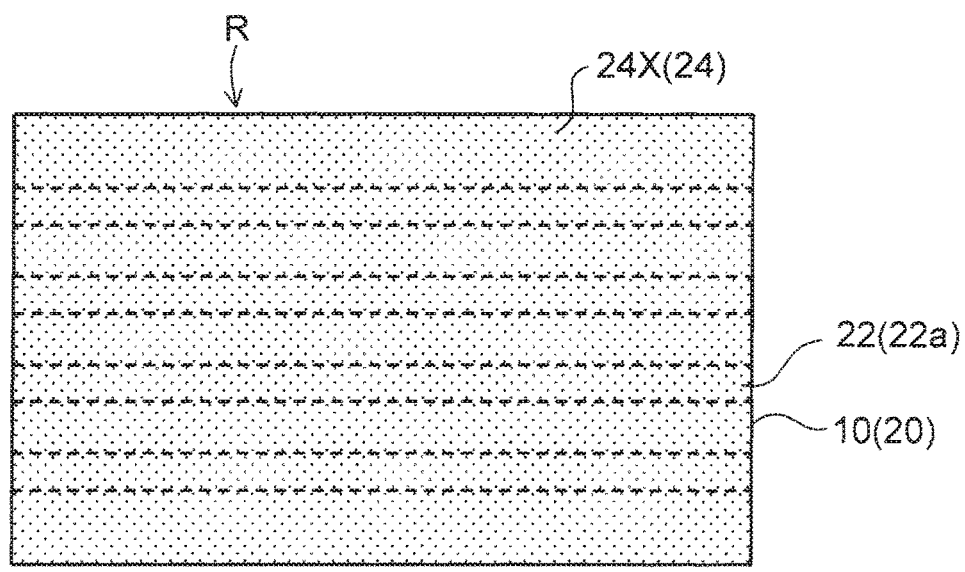
FIGS. 18A and 18B are a plan view and a sectional view showing the manufacturing method of the optical waveguide device according to the second embodiment (Part 2)
Figure 18B:
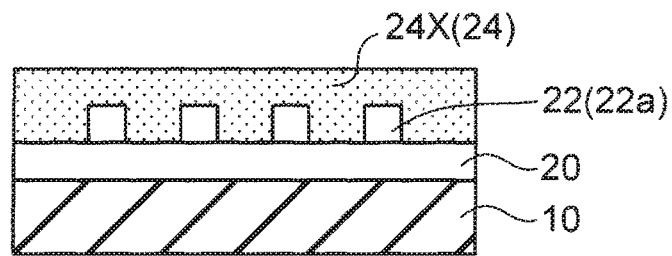

Next, as shown in FIGS. 18A and 18B, a photocurable resin 24x is formed on the first clad layer 20 and the core layers 22. In the second embodiment, the photocurable resin 24x is not exposed to light so that the entire photocurable resin 24x is left in an uncured state. Thus, a second clad layer 24 made of the uncured photocurable resin 24x is formed.

As will be described later, the uncured second clad layer 24 is dissolved and removed in a developing solution. As a result, the entire core layers 22 are exposed.

Alternatively, a positive type photosensitive resin may be used in place of the photocurable resin 24x (a negative type photosensitive resin). When the positive type photosensitive resin is used, the entire photocurable resin 24x is exposed to light. As a result, the photocurable resin 24x is changed to an uncured state to be soluble in a developing solution.

Thus, in a first example of the second embodiment, the entire second clad layer 24 is formed out of the uncured photosensitive resin.

In the second embodiment, the entire second clad layer 24 is finally removed from the optical waveguide device, as will be described later. For this reason, various protective layers which can be removed finally may be formed in addition to the formation of the uncured second clad layer 24 made of the resin having a required refractive index.

Figure 19A:
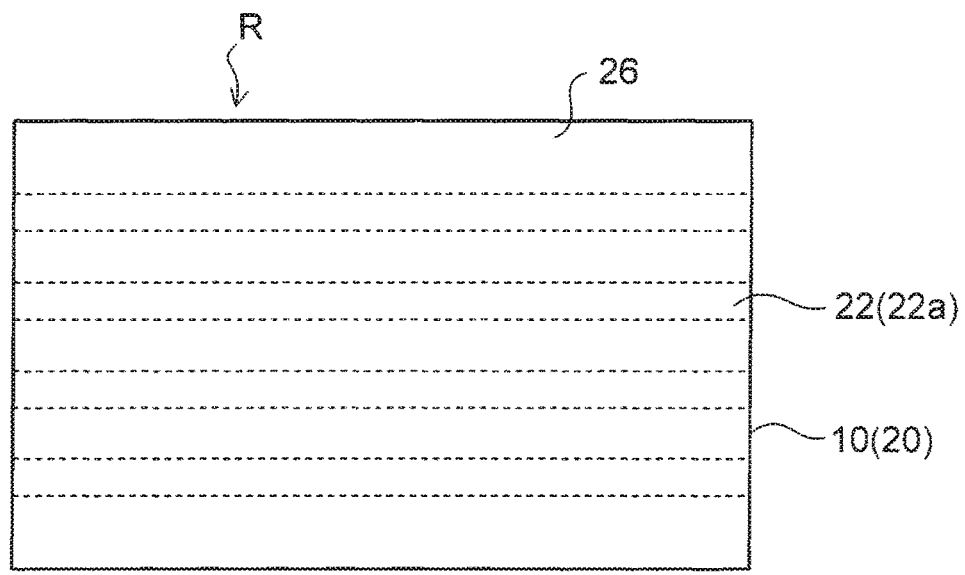
FIGS. 19A and 19B are a plan view and a sectional view showing a manufacturing method of an optical waveguide device according to a modification of the second embodiment.
Figure 19B:
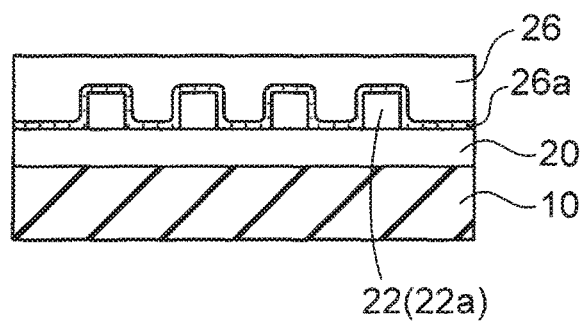

For example, as shown in FIGS. 19A and 19B, a resin film 26 may be temporarily bonded as a protective layer to the first clad layer 20 and the core layers 22 through an adhesive layer 26a.

In this case, the adhesive layer 26a is released from the first clad layer 20 and the core layers 22 to remove the resin film 26. Thus, the entire core layers 22 can be exposed. For example, a PET (polyethylene terephthalate) film can be used as the resin film 26.

As described above, the protective layer is formed in a removable state on the first clad layer 20 and the core layers 22. Preferred examples of the protective film are the uncured second clad layer 24, and the resin film 26 temporarily bonded through the adhesive layer 26a.

Thus, in a second example of the second embodiment, the resin film 26 is temporarily bonded to the first clad layer 20 and the core layers 22 through the adhesive layer 26a in place of the second clad layer 24 made of the uncured photosensitive resin.

Figure 20:
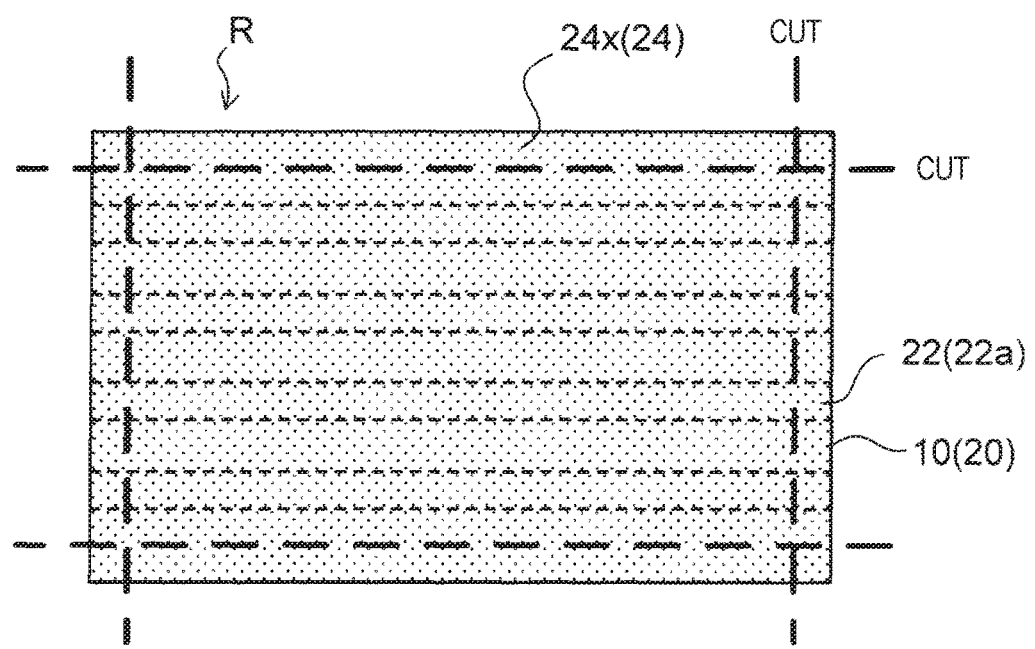
FIG. 20 is a plan view showing the manufacturing method of the optical waveguide device according to the second embodiment (Part 3)
Figure 21A:
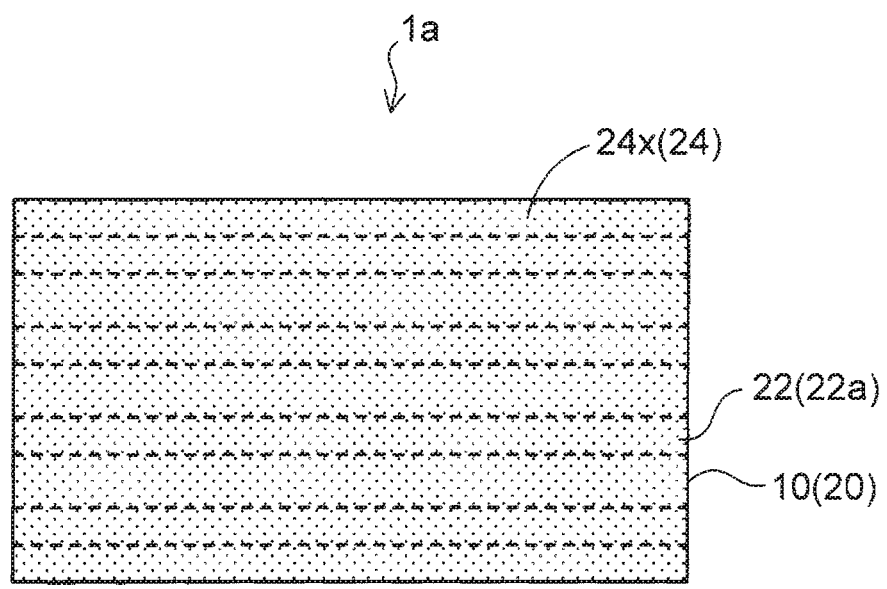
FIGS. 21A and 21B are a plan view and a sectional view showing the optical waveguide device according to the second embodiment.
Figure 21B:
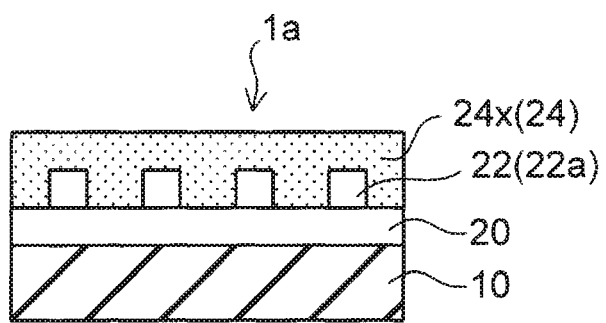

Successively, as shown in FIG. 20, an assembly including the second clad layer 24, the core layers 22, the first clad layer 20 and the substrate 10 is cut along an outer peripheral portion of each product region R of the substrate 10 and separated into an individual piece using a cutting apparatus (for example, a rotary blade) by a similar method to or the same method as the step of the aforementioned FIGS. 13A and 13B.

Also in the second embodiment, the core layers 22 are covered with the uncured second clad layer 24. Accordingly, the core layers 22 can be prevented from being damaged when the core layers 22 are cut. In addition, the core layers 22 can be prevented from being contaminated by cutting scraps.

In the aforementioned manner, an optical waveguide device 1a according to the second embodiment can be obtained, as shown in FIGS. 21A and 21B.

Also in the optical waveguide device 1a of FIG. 21A according to the second embodiment, respective end faces of the second clad layer 24, the core layers 22, the first clad layer 20 and the substrate 10 are flush with one another in an extension direction of the core layers 22.

In the optical waveguide device 1a according to the second embodiment, as shown in FIG. 21B, the first clad layer 20 is formed on the substrate 10, and the core layers 22 each shaped like a strip are formed on the first clad layer 20.

In addition, the second clad layer 24 is formed on the first clad layer 20 and the core layers 22. The entire second clad layer 24 is formed out of the uncured photosensitive resin. Since the second clad layer 24 is formed out of the uncured photosensitive resin, the second clad layer 24 is soluble and removable in a developing solution when the second clad layer 24 is treated by the developing solution.

Figure 22A:
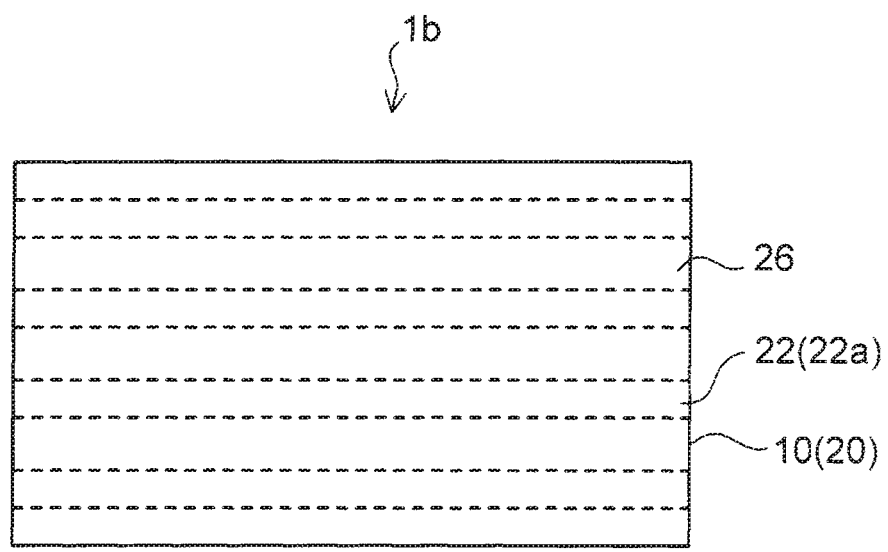
FIGS. 22A and 22B are a plan view and a sectional view showing the optical waveguide device according to the modification of the second embodiment.
Figure 22B:
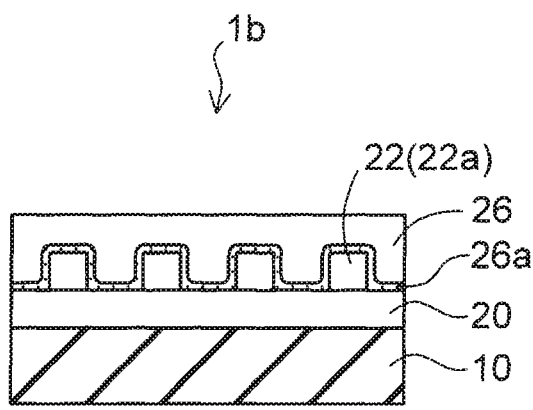

In addition, an optical waveguide device 1b according to a modification of the second embodiment is shown in FIGS. 22A and 22B. The optical waveguide device 1b according to the modification is manufactured by the manufacturing method of the aforementioned FIGS. 19A and 19B.

In the optical waveguide device 1b according to the modification, as shown in FIGS. 22A and 22B, the resin film 26 is temporarily bonded on the first clad layer 20 and the core layers 22 through the adhesive layer 26a in place of the uncured second clad layer 24.

Thus, the core layers 22 may be covered with the protective layer which is formed in a removable state. Besides the uncured second clad layer 24, a resin material etc. not functioning as a clad layer may be formed as the protective layer.

Also in the optical waveguide device 1b according to the modification in FIG. 22A, respective end faces of the resin film 26, the core layers 22, the first clad layer 20 and the substrate 10 in the extension direction of the core layers 22 are flush with one another.

Figure 23A:
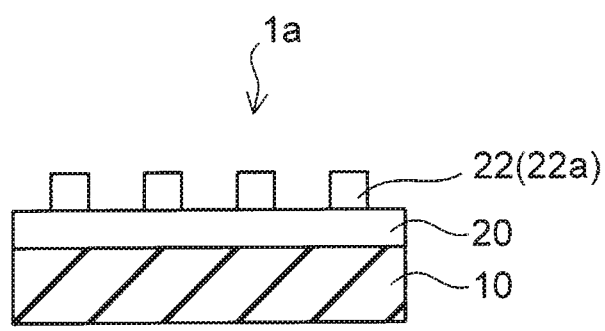
FIGS. 23A and 23B are sectional views showing a state in which an uncured second clad layer has been removed from the optical waveguide device of FIG. 21B.
Figure 23B:
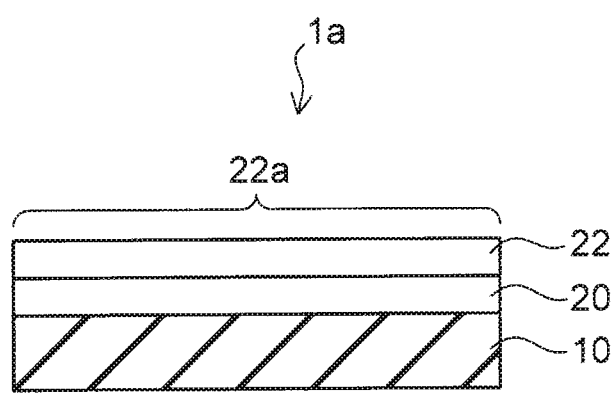

Next, a method of optically coupling a silicon waveguide to the optical waveguide device 1a according to the second embodiment will be described. As shown in FIGS. 23A and 23B, the optical waveguide device 1a in the aforementioned FIGS. 21A and 21B is treated by the developing solution so that the entire second clad layer 24 in the uncured state is soluble and removable in the developing solution.

Thus, the entire core layers 22 are exposed as the optical coupling portions 22a. FIG. 23B shows a section taken along the extension direction of the core layers 22.

When the optical waveguide device 1b according to the modification in the aforementioned FIGS. 22A and 22B is used, the adhesive film 26a of the resin film 26 is released from the first clad layer 20 and the core layers 22. As a result, the resin film 26 is removed. Thus, the entire core layers 22 are exposed as the optical coupling portions 22a in a similar manner to or the same manner as in FIGS. 23A and 23B.

Figure 24A:
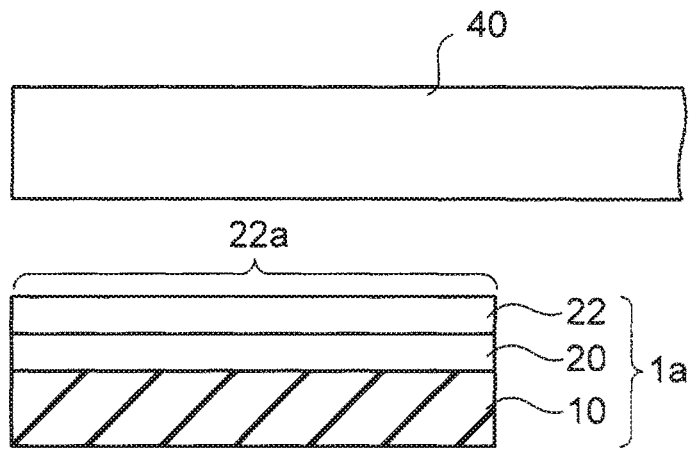
FIGS. 24A to 24C are sectional views showing a state in which a silicon waveguide is overlapped with core layers of the optical waveguide device of FIGS. 23A and 23B so as to be optically coupled thereto.

Next, as shown in FIG. 24A, the optical waveguide device 1a of FIG. 23B and a silicon waveguide 40 similar to or the same as that shown in FIG. 16A are prepared.

Figure 24B:
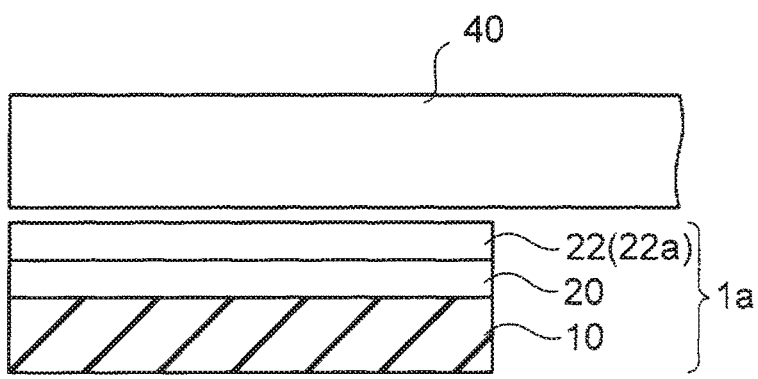

As shown in FIG. 24B, core layers of the silicon waveguide 40 are overlapped with upper faces of the core layers 22 (the optical coupling portions 22a) of the optical waveguide device 1a with an appropriate gap G (space) interposed therebetween. As a result, the core layers of the silicon waveguide 40 are optically coupled to the upper faces of the core layers 22 (the optical coupling portions 22a) of the optical waveguide device 1a respectively.

Light leaking out of lower faces of the core layers of the silicon waveguide 40 are incident on the core layers 22 (the optical coupling portions 22a) of the optical waveguide device 1a respectively. Thus, the lower faces of the core layers of the silicon waveguide 40 are optically coupled to the core layers 22 (the optical coupling portions 22a) of the optical waveguide device 1a respectively.

Figure 24C:
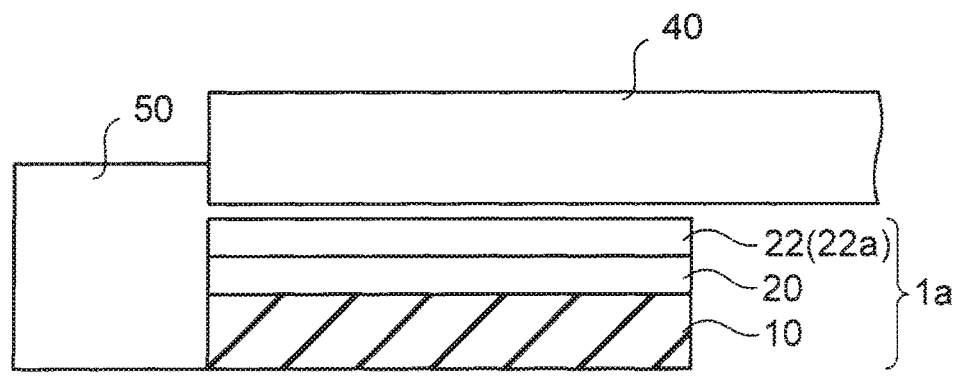

Further, as shown in FIG. 24C, a connector 50 is attached to one end of each core layer 22 (optical coupling portion 22a) of the optical waveguide device 1a. A fitting hole (not shown) is provided to extend inward from the side face of an outer end of the connector 50 attached to the optical waveguide device 1a.

When an alignment pin (not shown) of an external optical fiber etc. is fitted into the fitting hole of the connector 50, the external optical fiber etc. is aligned with the core layer 22 of the optical waveguide device 1a so as to be optically coupled thereto.

Also in the second embodiment, the entire core layers 22 serving as the optical coupling portions 22a can be exposed in a state that no damage is caused to the core layers 22 of the optical waveguide device 1a. Accordingly, the silicon waveguide 40 can be optically coupled to the optical waveguide device 1a reliably.

As described above, the exemplary embodiment and the modification are described in detail. However, the present invention is not limited to the above-described embodiment and the modification, and various modifications and replacements are applied to the above-described embodiment and the modifications without departing from the scope of claims.

Various aspects of the subject matter described herein are set out non-exhaustively in the following numbered clauses:

1) An optical waveguide device comprising:
a substrate;
a clad layer formed on the substrate;
a core layer formed on the clad layer; and
a resin film provided on the clad layer and the core layer through an adhesive layer so as to be temporarily bonded to the clad layer and the core layer.

2) The optical waveguide device according to clause (1), wherein respective end faces of the resin film, the core layer, the clad layer and the substrate are flush with one another.

3) A method of manufacturing an optical waveguide device, the method comprising:
a) forming a first clad layer (20) on a substrate;
b) forming a core layer on the first clad layer;
c) forming an uncured photosensitive resin on the first clad layer so as to cover the core layer;
d) curing a portion of the uncured photosensitive resin to thereby obtain a second clad layer, wherein the second clad layer comprises an uncured portion of the photosensitive resin covering a first portion of the core layer, and the cured portion of the photosensitive resin covering a second portion of the core layer; and
e) cutting an assembly including the second clad layer, the first clad layer and the substrate.

4) A method of manufacturing an optical waveguide device, the method comprising:
a) forming a first clad layer on a substrate;
b) forming a core layer on the first clad layer;
c) forming a second clad layer on the first clad layer so as to cover the core layer, the second clad layer consisting of an uncured photosensitive resin; and
d) cutting an assembly including the second clad layer, the core layer, the first clad layer and the substrate.

5) A method of manufacturing an optical waveguide device, the method comprising:
a) forming a clad layer on a substrate;
b) forming a core layer on the clad layer; and
c) disposing a resin film on the clad layer and the core layer through an adhesive layer so as to be temporarily bonded to the clad layer and the core layer; and
d) cutting an assembly including the resin film, the clad layer and the substrate.

6) The method according to clause (3), wherein the core layer is cut in a state that the core layer is protected by the photosensitive resin in the step e).

What is claimed is:

1. An optical waveguide device comprising:
a substrate;
a first clad layer formed on the substrate;
a core layer formed on the first clad layer; and
a second clad layer formed on the first clad layer so as to cover the core layer, the second clad layer comprising an uncured photosensitive resin covering a first portion of the core layer, and a cured photosensitive resin covering a second portion of the core layer,
wherein respective end faces of the second clad layer, the core layer, the first clad layer and the substrate are flush with one another.

2. The optical waveguide device according to claim 1, wherein the uncured photosensitive resin is soluble and removable in a developing solution.

3. An optical waveguide device comprising:
a substrate;
a first clad layer formed on the substrate;
a core layer formed on the first clad layer; and
a second clad layer formed on the first clad layer so as to cover the core layer; the second clad layer consisting of an uncured photosensitive resin,
wherein respective end faces of the second clad layer, the core layer, the first clad layer and the substrate are flush with one another.

* * * * *